United States Patent

Dietz et al.

[11] Patent Number: 5,943,868
[45] Date of Patent: Aug. 31, 1999

[54] ABSORPTION REFRIGERATING MACHINE AND PROCESS FOR THE OPERATION THEREOF

[75] Inventors: Bernhard Dietz, Dortmund; Roland Kunkel, Essen; Peter Noeres, Gelsenkirchen, all of Germany

[73] Assignee: Fraunhofer-Gesellschaft zur Forderung der angewandten Forschung e.V,, Germany

[21] Appl. No.: 09/043,270

[22] PCT Filed: Sep. 5, 1996

[86] PCT No.: PCT/DE96/01689

§ 371 Date: May 6, 1998

§ 102(e) Date: May 6, 1998

[87] PCT Pub. No.: WO97/11322

PCT Pub. Date: Mar. 27, 1997

[30] Foreign Application Priority Data

Sep. 15, 1899 [DE] Germany ............................ 195 35 840

[51] Int. Cl.⁶ .................................................... F25B 15/00
[52] U.S. Cl. ................................ 62/107; 62/235.1; 62/488
[58] Field of Search ............................ 62/101, 103, 107, 62/235.1, 141, 476, 488, 491

[56] References Cited

U.S. PATENT DOCUMENTS

| | | | |
|---|---|---|---|
| 2,795,940 | 6/1957 | Kogel | 62/103 |
| 3,140,589 | 7/1964 | Merrick | 62/107 |
| 3,527,061 | 9/1970 | Kruggel | 62/103 |
| 3,651,655 | 3/1972 | Dyre | 62/103 |
| 3,695,052 | 10/1972 | Griffin . | |
| 4,023,375 | 5/1977 | Chinnappa et al. . | |

FOREIGN PATENT DOCUMENTS

| | | |
|---|---|---|
| 581957 | 7/1933 | Germany . |
| 2540158 | 4/1976 | Germany . |
| 2719995 | 11/1978 | Germany . |
| WO89/01119 | 2/1989 | WIPO . |

OTHER PUBLICATIONS

Article H. Grallert, Ki Klima –Kälte—Heizung Apr. 1982, pp. 159–162, in German.

*Primary Examiner*—William Doerrler
*Attorney, Agent, or Firm*—Young & Basile, P.C.

[57] ABSTRACT

The invention relates to an absorption refrigerating machine and a process for the operation thereof. It can be used as a household cooling appliance, for example as the last link in the cold chain, or for the cooling of medicine or as a refrigerating set of an air-conditioning system, and use in a stand-alone variant without an electrical energy connection is possible. The absorption refrigerating machine has a condenser, an evaporator and an absorber, and a refrigerant-absorbent mixture can be circulated through all three. There is also at least one solar collector for heating to above the refrigerant boiling point and a refrigerant storage unit connected to the condenser. High-pressurized liquid refrigerant is held in the refrigerant storage unit, and an absorbent storage unit and a desorbent storage unit are connected to the absorber.

20 Claims, 1 Drawing Sheet

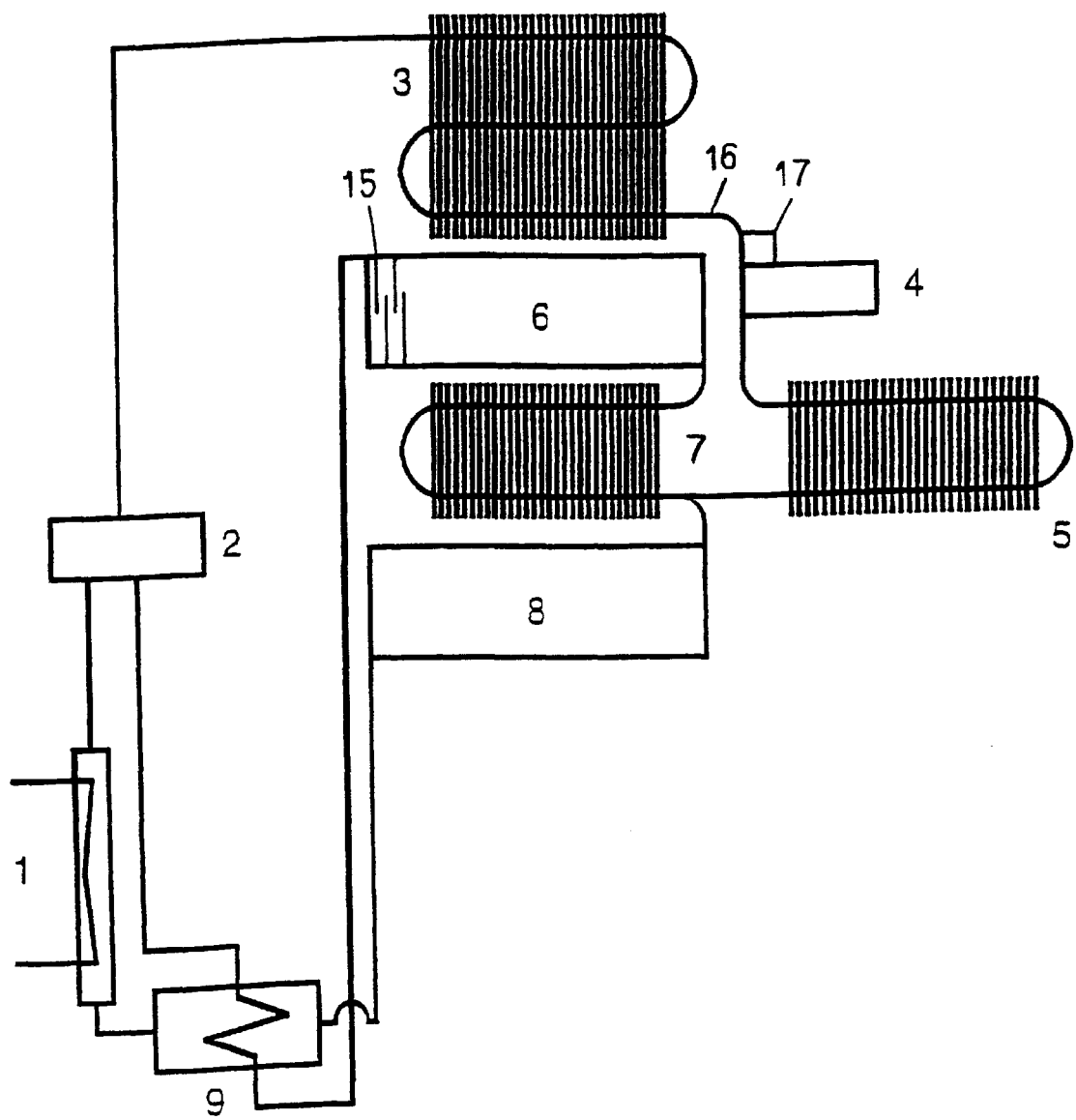

ABSORPTION REFRIGERATING MACHINE AND PROCESS FOR THE OPERATION THEREOF

BACKGROUND OF THE INVENTION

The invention relates to an absorption refrigerating machine and a method for its operation. It may be used as a domestic cooling appliance, for example as the last link in the cold chain, or for cooling medicines, or as a cooling set in an air conditioning system, its use being possible as a stand-alone variant without connection to an electrical power supply.

In sorption refrigerating machines it is known that gases or vapours are bound under certain conditions to another material (solvent) and under other conditions are driven out again. The "condensation" is effected by the deposition of a pure coolant on a material partly led in a second circuit. The energy supplied to this system is used in such a way that the coolant is separated from the second medium. The heat released during the deposition can be removed to the atmosphere, whilst the energy for the separation procedure is absorbed as heat. Such a refrigerating machine has the advantage that no moving parts are required which are subject to wear or cause noise. A disadvantage is however that these machines have a lower degree of efficiency compared to the known compression machines.

A special embodiment of such refrigerating machines are absorption refrigerating machines in which the mixture comprising coolant and solvent is fed into a rectifier or ejector and, by the application of heat, is brought to boiling point. The coolant vapour thus ejected is precipitated in a condenser and the liquid resulting there cools intensely during the pressure release in the evaporator. During evaporation the heat is taken up out of the material to be cooled. The resultant vapour flows into the absorber, in which also the residual liquid from the rectifier is de-pressurised. This residual liquid trickles through the vapour and thus absorbs it. The resultant absorption heat is removed to the environment. The mixture formed from coolant and solvent is in turn passed into the rectifier and then, with renewed separation, the circuit is completed.

Further disadvantages of the known absorption refrigerating machines are pressure losses occurring between ejector and condenser, the incomplete rectification (the coolant flowing to condenser and evaporator still contains a small residual content of solvent), the incomplete evaporation due to the residual content of solvents, a further pressure loss between evaporator and absorber, and incomplete ejection and incomplete heat-exchange within the solvent circuits, and an incomplete absorption (causes supercooling of the solution) leading to a reduction in the coolant performance and thus the greatest disadvantage.

All this leads to a situation in which a relatively large amount of energy must be supplied in order to achieve a corresponding cooling effect, which, as already stated, results in a reduction in efficiency.

First experiments using solar energy showed that in particular when ammonia is used as a coolant, problems arise which do not permit such refrigeration machines to be used simply. When ammonia is used, its toxicity is a substantial disadvantage, which greatly restricts the universality of any possible use. Furthermore, pressure levels must be controlled and a special rectifier device is necessary, these likewise considerably restricting the possibilities of use.

Thus there is known from WO 88/08109 an absorption refrigerating system with a solar collector, which is intended to be postponed to particular periods of time, in order for example to utilise more favourable night current tariffs. In this absorption refrigerating machine, likewise, liquid coolant is intermediately stored. In this case storage is in liquid containers disposed in the evaporator. Thus however regulation is likewise not possible. The generation of cold depends on the capacity of the evaporator and the quantity of liquefied coolant which is generated and which can be stored. In this refrigerating machine it is also suggested to store absorbent agent, also incompletely, in supply spaces accommodated in the absorber.

Another absorption refrigerating machine is described in DE OS 27 19 995, which is intended to be operated continuously or periodically. This refrigerating machine is separated by means of separator valves into a high pressure and low pressure portions, which can be operated separately or in common. Storage units for coolant, the solution or absorbent agent and for solution with a high coolant content are used. In this known absorption refrigerating system it is however absolutely necessary to use pumps or condensers for transporting the solution and coolant, which impair the degree of efficiency and requires a site which has available a connection for electrical power or generation of electrical power. Moveover the different separating valves must be operated in dependence on operational condition, which requires a complex control or regulating.

Solutions for a continuous generation of cold utilising energy sources which are not permanently present, as is the case with solar energy, have however not yet been discovered in a practicable form for use a stand-alone variant.

SUMMARY OF THE INVENTION

It is therefore the object of the invention to improve absorption refrigerating machines in such a way that their consumption of energy is kept as low as possible and continuous operation may be achieved.

In the absorption refrigerating machine designed according to the invention, a lithium bromide/water mixture is preferably used, and this pair of materials is heated directly in a solar collector and brought to boiling point, separation of coolant from the absorbent agent being effected and the coolant, which still only contains a small proportion of the absorbent solution, is transported by thermosiphon effect to a condenser.

A lithium bromide/zinc bromide/water mixture has even better properties which can be used as a coolant, whose salt components are mixed in a molar ratio of 1:1. In this case operation can be in a temperature range between 0 and 60° C., without absorption of the coolant coming to a standstill or crystallisation of the stored solution occurring.

Cooling systems used at present with the material pair ammonia/water could only be operated with concentrating solar collectors, as the lower necessary generator temperature, at 170° C., considerably increases the logical operational range of vacuum tubes and flat collectors. For use of these collector types, the coolant pair must be diluted with water, which entails a considerable reduction in the efficiency of the system.

The absorbent agent separated during the boiling procedure is passed hydrostatically to an absorbent agent storage unit and kept in readiness for renewed introduction into the circuit. Preceding the condenser is an additional vapour separator, in which the coolant vapour is again separated from the absorbent agent, and thus it is ensured that only an extremely small proportion of absorbent agent is contained in the coolant vapour.

The condenser is advantageously constructed as an air-cooled finned tube. The coolant vapour condenses out in this and is passed in liquid form to a coolant storage unit serving as a buffer. Following the coolant storage unit is an evaporator likewise constructed as a finned tube, which can be continuously supplied with coolant via a capillary.

Depending on the requirements for coldness, metering of the coolant into the evaporator can be influenced by control or regulation of the pressure, of the coolant supplied via the capillary or via the filling level of the coolant in the coolant storage unit.

In this case the coolant storage unit advantageously acts as a buffer and makes it possible, even when there is an interrupted energy supply, as can be the case with insufficient solar radiation, that a continuous generation of cold is nevertheless ensured. The likewise already named absorbent agent storage unit acts in the same manner, in which the absorption solution is kept in readiness in sufficient quantities, in order likewise to absorb the stored coolant after its evaporation, without energy being supplied.

The coolant emerging from the evaporator is introduced into an absorber likewise constructed as an air-cooled finned tube, in the same way as the absorbent agent, which may be supplied via a baffle. Metering of the absorbent agent may be effected with the aid of the baffle or via the filling level in the absorbent agent storage means. The coolant/absorption mixture is hydrostatically returned again to the solar collector for evaporation.

In the following, desorption solution will be understood to mean rich absorption solution.

There is also present a desorption agent storage unit, in which a quantity of a desorption solution is stored, which is then sufficient to generate coolant, even when the energy supply is interrupted (insufficient impingement of sunlight on the solar collector) in order nevertheless to provide a continuous cooling operation. Thus the concentration of coolant in the desorption solution is so adjusted that even upon maximum solar radiation the crystallisation threshold of the desorption solution in the solar collector is not reached.

By means of the air cooling which is preferably used, which requires no further energy, an increased temperature is reached, so that the risk of crystallisation rises. Thus at an ambient temperature of about 35° C., about 50° C. occurs in the absorber and condenser. By means of using ethylene glycol in a mass ratio of 1:4.5 with respect to the lithium bromide, at temperatures between 43 and 49° C. in the condenser and absorber the crystallisation undesirable for operation of the refrigerating machine is avoided.

Condensation of the coolant vapour is achieved in a condenser constructed as an air-cooled finned tube. Using a hydrostatic pressure, the coolant is continuously passed into the evaporator, which is constructed as a coiled tube. With the evaporator, heat is withdrawn from the material to be cooled, and thus in the desired way cold is generated.

The absorption solution passed into the absorber is also under a specific hydrostatic pressure, the absorber likewise being capable of being designed as an air-cooled finned tube.

The invention will be described in more detail in the following with reference to an embodiment given by way of example.

BRIEF DESCRIPTION OF THE DRAWING

Thus the single FIGURE shows a circuit diagram of an embodiment of an absorption refrigerating machine designed according to the invention with direct contact to a solar collector.

DESCRIPTION OF THE PREFERRED EMBODIMENT

In the embodiment of an absorption refrigerating machine designed according to the invention and shown in the FIGURE, absorption agent is brought via pipes out of an absorbent agent storage unit 6 and rich absorption agent solution out of a desorption agent storage unit 8 into the solar collector 1 via a temperature changer 9, by means of which a temperature of the mixture is maintained which ensures that both components are present in the liquid phase, and the mixture is brought to boiling point therein. In this case a lithium bromide/water mixture is preferably used, which is neither toxic nor causes any risk to the environment. A solution with a low water content is passed through the temperature changer 9 before the entry into the absorbent agent storage unit, and the solution with a high water content before the entry into the ejector.

By means of the thermosiphon effect, the absorption solution, with a low coolant content, passes through rising coolant vapour into a vapour separator 2 preceding a condenser 3, and in which absorption agent is again separated from the coolant. The coolant vapour is condensed in the condenser 3 and passes in this form into a coolant storage unit 4, preceding the evaporator 5, and serving as a buffer for the case where the solar energy passing on to the solar collector 1 is insufficient to ensure continuous operation of the refrigerating machine.

The cooling temperature can be regulated in such a way that the pressure or the filling level in the coolant storage unit 4 are correspondingly influenced. Thus the coolant storage unit 4 must be sufficiently insulated and be of such dimensions as to be capable of accommodating a quantity of coolant which is sufficient to fulfil this requirement.

The liquid coolant supplied from the coolant storage unit 4 cools intensely upon the pressure drop in the evaporator 5, and heat can be taken in from the exterior. The resultant vapour flows into a subsequent absorber 7, in which also a residual pressure release can be undertaken. The absorber 7 is connected via pipes to the absorbent agent storage unit 6 and the desorbent agent storage unit 8. The heat resulting in the absorber 7 can be given off to the environment.

Moreover, the circuit is connected to further pipes, and the lithium bromide/water mixture can again be passed via the solar collector 1 and be heated, so that a closed circuit is formed.

What is claimed is:

1. An absorption refrigeration machine with a condenser, an evaporator, and an absorber disposed in a circuit through which a mixture of a coolant agent and an absorbent agent is circulated, the circuit comprising:

at least one solar collector for heating the mixture to above the boiling point of the coolant agent for ejecting the coolant agent from the mixture;

a coolant agent storage unit succeeding the condenser in a circulating direction and accommodating pressurized liquid cooling agent; an absorbent agent storage unit and a storage unit for rich absorbent agent solution connected to the absorber; a capillary disposed between the coolant agent storage unit and the condenser;

a hydrostatic regulation system disposed at the coolant agent storage unit, the hydrostatic regulation system acting in dependence on a filling level of the coolant agent storage unit and metering the coolant agent in co-operation with the capillary; and at least one of a baffle and a filling level regulation system for metering the absorbent agent.

2. The absorption refrigeration machine according to claim 1, wherein the circuit further comprises a vapour separator, the vapour separator preceding the condenser in the circulating direction (3).

3. The absorption refrigeration machine according to claim 1, wherein the storage unit for rich absorbent agent solution accommodates a quantity of desorption solution enabling continuous operation of the absorption refrigeration machine.

4. The absorption refrigeration machine according to claim 1, wherein at least one of the condenser, the evaporator and the absorber are an air-cooled finned tube.

5. A method of operating an absorption refrigeration machine, comprising:
   a) heating a mixture of a coolant agent and an absorption agent in a solar collector;
   b) transporting an absorption solution with a low coolant content by a thermosiphon effect of a coolant vapour out of the solar collector into a condenser;
   c) storing liquid coolant agent in a coolant agent storage unit;
   d) passing the stored liquid coolant agent in a hydrostatically regulated metered fashion from the coolant agent storing unit to an evaporator;
   e) passing at least one of the absorption agent out of an absorption agent storage unit by means of a baffle to an absorber and a mixture with a high coolant agent content hydrostatically to the solar collector.

6. The method according to claim 5, wherein a mixture of lithium bromide in water is used.

7. The method according to claim 5, wherein a mixture of lithium bromide and zinc bromide in water with a molar ratio of lithium bromide and zinc bromide of 1:1 is used.

8. The method according to claim 6 wherein ethylene glycol is added to the mixture.

9. The method according to claim 8, wherein ethylene glycol is added to the lithium bromide at a mass ratio of 1:4.5.

10. Method according to claim 5, characterised in that a lithium bromide/zinc bromide/water mixture is used as a coolant, whose molar ratio of the salt components lies at 1:1.

11. Method according to claim 6, characterised in that ethylene glycol is added to the coolant mixture.

12. Method according to claim 11, characterised in that ethylene glycol is added at a mass ratio of 1:4.5 with respect to the lithium bromide.

13. Method according to claim 5, characterised in that the concentration of the coolant in the desorption agent storage unit is so adjusted that upon maximum solar radiation the crystallisation threshold of the desorption solution in the solar collector is not reached.

14. Method according to claim 5, characterised in that heat is withdrawn from the material to be cooled with the evaporator.

15. Method according to claim 5, characterised in that the absorber is cooled.

16. The absorption refrigeration machine according to claim 1, wherein the mixture is a mixture of lithium bromide in water.

17. The absorption refrigeration machine according to claim 1, wherein the mixture is a mixture of lithium bromide and zinc bromide in water, a molar ratio of lithium bromide and zinc bromide being 1:1.

18. The absorption refrigeration machine according to claim 16, wherein ethylene glycol is added to the mixture.

19. The absorption refrigeration machine according to claim 18, wherein a mass ratio of ethylene glycol and lithium bromide is 1:4.5.

20. The method according to claim 5, wherein a concentration of the coolant in a storage unit for rich absorption solution is adjusted such that upon maximum solar radiation a crystallization threshold of a rich absorption solution in the solar collection is not reached.

* * * * *

UNITED STATES PATENT AND TRADEMARK OFFICE
CERTIFICATE OF CORRECTION

PATENT NO. : 5,943,868
DATED      : Aug. 31, 1999
INVENTOR(S) : RICHARD DIETZ; ROLAND KUNKEL; PETER NOERES

It is certified that error appears in the above-identified patent and that said Letters Patent is hereby corrected as shown below:

On the title page: Item

[30] DELETE "Sep. 15, 1899" and

INSERT

- - SEP. 15, 1995 - -.

Signed and Sealed this

Ninth Day of May, 2000

*Attest:*

Q. TODD DICKINSON

*Attesting Officer*     *Director of Patents and Trademarks*